United States Patent
Danilov et al.

(10) Patent No.: US 10,315,237 B2
(45) Date of Patent: Jun. 11, 2019

(54) PIG, IN PARTICULAR INSPECTION OR CLEANING PIG

(71) Applicant: Rosen Swiss AG, Stans (CH)

(72) Inventors: Andrey Danilov, Lingen (DE); Thomas Beuker, Münster (DE)

(73) Assignee: Rosen Swiss AG, Stans (CH)

( * ) Notice: Subject to any disclaimer, the term of this patent is extended or adjusted under 35 U.S.C. 154(b) by 376 days.

(21) Appl. No.: 14/904,569

(22) PCT Filed: Jul. 3, 2014

(86) PCT No.: PCT/EP2014/001830
§ 371 (c)(1),
(2) Date: Jan. 12, 2016

(87) PCT Pub. No.: WO2015/003783
PCT Pub. Date: Jan. 15, 2015

(65) Prior Publication Data
US 2016/0167094 A1    Jun. 16, 2016

(30) Foreign Application Priority Data

Jul. 12, 2013  (DE) .................. 10 2013 011 626

(51) Int. Cl.
*B60L 7/28* (2006.01)
*G01M 3/00* (2006.01)
(Continued)

(52) U.S. Cl.
CPC ............ *B08B 9/055* (2013.01); *B08B 9/0551* (2013.01); *B60L 7/28* (2013.01); *G01M 3/005* (2013.01);
(Continued)

(58) Field of Classification Search
CPC ......... B08B 9/055; B08B 9/0551; B60L 7/28; F16D 63/004; G01M 3/005;
(Continued)

(56) References Cited

U.S. PATENT DOCUMENTS 3,495,626 A    2/1970  Nagel
6,041,897 A    3/2000  Saumweber et al.
(Continued)

FOREIGN PATENT DOCUMENTS

| | | |
|---|---|---|
| DE | 19620783 A1 | 5/1997 |
| EP | 1828764 B1 | 6/2012 |
| WO | 03078887 A1 | 9/2003 |

OTHER PUBLICATIONS https://en.wikipedia.org/wiki/Eddy_current_brake, accessed on Dec. 15, 2017.*

(Continued)

*Primary Examiner* — Laura C Guidotti
(74) *Attorney, Agent, or Firm* — Alix, Yale & Ristas, LLP

(57) ABSTRACT

A pig, in particular an inspection or cleaning pig, for passing through an elongate pipe having a pipe wall, preferably a gas pipeline, said pig comprising at least one functional unit for cleaning the pipe and/or for gathering pipe information and comprising a plurality of magnets, and said pig having an eddy current-braking unit formed by the magnets.

20 Claims, 11 Drawing Sheets

(51) Int. Cl.
    *B08B 9/055* (2006.01)
    *F16L 101/12* (2006.01)
    *F16L 101/30* (2006.01)

(52) U.S. Cl.
    CPC ....... *F16L 2101/12* (2013.01); *F16L 2101/30* (2013.01)

(58) Field of Classification Search
    CPC ............... G01M 3/2823; F16L 2101/12; F16L 2101/30; F16L 2101/10; F16L 2101/00
    USPC ....................................... 15/104.061, 104.05
    See application file for complete search history.

(56) References Cited

U.S. PATENT DOCUMENTS

| | | | | |
|---|---|---|---|---|
| 7,137,308 B2* | 11/2006 | Harris | ................... | G01M 3/005 |
| | | | | 73/865.8 |
| 8,894,772 B2* | 11/2014 | Phipps | .................. | B08B 9/0551 |
| | | | | 134/22.1 |
| 2005/0229342 A1* | 10/2005 | Simpson | ................. | F16L 55/32 |
| | | | | 15/104.061 |
| 2007/0022830 A1 | 2/2007 | Mandziuk et al. | | |
| 2011/0127999 A1* | 6/2011 | Lott | ....................... | G01R 33/04 |
| | | | | 324/239 |

OTHER PUBLICATIONS

International Search Report dated Sep. 16, 2014 (PCT/EP2014/001830).

* cited by examiner

PIG, IN PARTICULAR INSPECTION OR CLEANING PIG

BACKGROUND

The present invention relates to a pig, in particular an inspection or cleaning pig, for traveling through an elongate pipe, preferably a gas pipeline, the pig having at least one functional unit for cleaning the pipe and/or for recording pipe information and also a plurality of magnets. Pipe information may be, for example, information on the position of cracks, points of corrosion, pipe (wall) deformations or diameters.

The prior art according to EP 1 828 764 B1 discloses a pig which has a functional unit for recording pipe information for the identification of defects in the pipe wall. For this purpose, the pig has a plurality of magnets, which magnetize the pipe wall in a region that can be scanned by the sensors. A disadvantage of the passively moved pigs is that, depending on the operating medium and the friction produced in the pipe, they may move along at different rates. For example, the friction increases at cross-sectional constrictions of the pipe, and so the speed of the pig is reduced. As a consequence, in particular in the case of a gas pipeline, pressure builds up behind the pig, and then strongly accelerates the pig at the moment that the frictional resistance is overcome. This leads to inferior quality of the data of the measurement, even to the extent of failure of the measurement for the region in which the pig is moved along above a critical speed of for example 5 m/s.

SUMMARY

It is the object of the present invention to be able to keep better control over the speed of a pig that is used in pipes, preferably gas pipelines.

The object is achieved by a device according to claim 1. Advantageous refinements of the invention can be taken from the dependent claims referring back to claim 1 and to the description that follows.

According to the invention, it is provided that the pig has an eddy current braking unit formed at least as part of the unit formed by the magnets. This eddy current braking unit, which may be formed as part of an existing pig or as a braking unit that can be additionally coupled onto an existing pig, provides the pig with a wear-free brake, which specifically exploits the interaction of magnetic fields in a wall of the pipe generated on account of eddy currents by the magnets of the pig to produce a braking force and to keep the speed under control.

In particular, by interaction of the magnets with magnetic fields induced in the wall of the pipe on account of eddy current or eddy currents, a speed-dependent braking force is produced, with the effect of preventing the pig from reaching a speed that is unacceptable for cleaning or recording measurement data. For the situation described above, with an increased frictional resistance for example on account of a weld seam, with a pig according to the invention a less strong acceleration is obtained when the frictional resistance is overcome, since the braking force emanating from the eddy current braking unit increases with increasing speed. Conversely, the braking force drops to "0" when the speed is reduced to "0".

The eddy current braking unit is formed as part of the unit formed by the magnets at least in the sense that it generally has further parts besides, such as for example holding means by way of which the magnets are held in a specific position or by way of which the eddy current braking unit is connected to further segments of the pig.

In comparison with magnets known from the prior art that are used for pre-magnetizing the wall of the pipe or the pipe wall and for recording pipe information, the forces produced by an eddy current braking unit are greater by at least a factor of 5, preferably a factor of 10. Only in this way can a sufficient effect be achieved, with the aim of keeping the speed of the pig within desired ranges, or at least more within desired ranges.

In particular, the magnets of the eddy current braking unit are designed in such a way that the eddy current braking forces produced by the eddy current braking unit are greater than the increases in frictional force that typically occur or are to be expected in a pipeline, for example on account of weld seams, dents or the like. It is true that a greater pressure is necessary behind the pig according to the invention for starting the pig and for reaching the flow rate of the pipe medium. However, if the pig meets an obstacle, for example a weld seam in the pipeline, and the speed is reduced as a result, the braking force emanating from the eddy current braking unit is reduced, which counteracts the reduction in speed. The pig consequently moves more uniformly, which is advantageous for cleaning and data recording operations. In the ideal case and desired operational case, when the braking forces of the eddy current braking unit are greater at the measuring speed than the increases in frictional or braking force exerted by any obstacles there may be in the pipe, the speed-dependent braking force allows the pig to pass over obstacles without stopping, and consequently avoids excessive speeds being caused by a gas pressure building up behind the pig when it stops.

After passing over the obstacle, any additionally built-up pressure, and the accompanying increase in speed, is compensated by way of the increase in the braking force on account of the eddy current braking unit in such a way that the maximum speed does not exceed a limit value given for measurement or cleaning, or only briefly.

While in the prior art the magnets used are often used to bring wide regions of the pipe wall into the region of magnetic saturation, the aim with the construction of the eddy current braking unit is to avoid saturated regions as much as possible and obtain a maximum of (magnetic) flux density perpendicular to the inner surface of the pipe over as wide a region as possible. The build-up of eddy currents with the desired effect takes place in particular by a magnetic flux running perpendicularly to the inner surface of the pipe and in the wall thereof. For this, the magnets are arranged one behind the other with alternating polarities in the longitudinal direction of the pig, i.e. in a direction that corresponds to a longitudinal direction of the pipeline, in order in this way to increase the region with a magnetic flux running perpendicularly to the inner pipe surface and reduce the influence of saturation.

In particular, the magnets are arranged in such a way that the alignment of south pole to north pole runs parallel to the longitudinal direction of the pig. Effective eddy current braking units are preferably provided in the longitudinal direction of the pig with at least three magnets arranged one behind the other with opposing alignments, i.e. alternating polarities. This is improved by there being at least four, five or six magnets arranged one behind the other. The number of magnets is to be based on the desired braking force and the ability of the pig to negotiate bends.

While the magnets may also be aligned perpendicularly to the longitudinal axis of the pig, in order to generate directly a magnetic field that is directed into the pipe wall and is directed perpendicularly thereto, in particular magnets that are aligned in the longitudinal direction, and consequently parallel to the longitudinal center axis of the pig, are at least provided with a magnetically permeable connecting element, which preferably connects two magnets to one another. Such a connecting element serves for the specific concentration and/or introduction of field lines into the pipeline wall and is aligned with a longitudinal axis that runs in the direction of its longest extent in particular perpendicularly to the pipeline wall, and is preferably to be positioned close to the wall. The connecting element may be formed from one or more pieces, for example from a number of bars or plates lying against one another.

Particularly advantageous is a formation with a total of at least 4 magnetic connecting elements that respectively have a magnet between them, and so the construction forms at least three magnetic circuits, i.e. closed paths of the magnetic flux, arranged one behind the other in the direction of travel. The closed paths run through the connecting elements, the permanent magnets or electromagnets, the pipe wall and any gaps there may be between the individual elements.

An eddy current braking unit according to the invention is preferably used to generate eddy currents in the pipe wall, running in the circumferential direction around the pig, with the aid of which improved braking forces, to be specific eddy current braking forces, can be achieved. The possible braking forces are even greater if the magnets are arranged alternatingly one after the other, and in particular also connected by permeable connecting pieces, in such a way that a plurality of eddy currents flowing alternately in opposite directions are generated.

In order to produce highest possible alternating flux densities in the pipe wall, and here perpendicularly to the inner surface of the pipe, and at the same time to optimize the eddy current braking unit from the aspect of negotiating bends in the pipe, the extent of the magnets from pole end to pole end is less than the extent of the magnets transversely thereto. The magnets are consequently flat. This is preferably in the direction along the longitudinal axis of the pig. With magnetically permeable connecting elements that are likewise formed flat, i.e. short in the direction of the longitudinal center axis, correspondingly high fluxes directed in opposite directions can be produced in the pipe. The extent of the connecting elements may then preferably be greater here in the direction perpendicular to the inner surface of the pipe, and consequently also perpendicular to the longitudinal axis of the pig, than in the direction transverse thereto.

The combination of a magnet with at least one magnetically permeable connecting element or else with two magnetically permeable connecting elements each on one side leads to the formation of a magnetic yoke, i.e. a combination of a magnetically permeable material with a permanent magnet or electromagnet. The same connecting element may at the same time be part of two adjacent magnetic yokes. Correspondingly, the sequence of the magnets with the connecting elements may together also be referred to as a sequence of in particular five interconnected magnetic yokes.

The individual magnetic yokes may be arranged one directly behind the other in the longitudinal direction. In order to improve the ability to negotiate bends and ability to adapt to defects in the pipe, the individual yokes may, when considered in the longitudinal direction, also be arranged flexibly against one another or relatively movably in relation to one another.

The magnetically permeable connecting element is in particular formed as a plate or bar or by a plurality of bars.

For easier construction of the tool, multiple magnets are arranged on a carrier unit. In particular, one behind the other in the longitudinal direction. The formation of eddy current fields in the pipe is additionally improved if multiple carrier units are arranged next to one another in the circumferential direction of the pig. It is thus conceivable that, with respect to a longitudinal center axis of the pig, an eddy current braking unit has magnets only on one side of the axis. However, it is more advantageous for the formation of eddy currents running around completely in the circumferential direction if magnets are for example also arranged on the opposite side, then lying next to the further magnets in the circumferential direction.

There are preferably a plurality of carrier units lying next to one another in the circumferential direction, in particular more than three, and so, within the installation space that is available, the eddy current braking unit is provided with magnets running around in the circumferential direction, and an optimum alignment of eddy currents running around the pig in the circumferential direction is correspondingly achieved. In particular, the carrier units are arranged next to one another rotationally symmetrically in the circumferential direction with smallest possible gaps.

The pig preferably has at least one spacer, by way of which the magnets can be positioned at a distance from the wall. When there are a plurality of carrier units, the spacer may be centrally responsible for all the carrier units. In particular, however, each carrier unit is assigned at least one spacer. Still more advantageously, each carrier unit has at least one spacer respectively at its beginning and at its end in the longitudinal direction. The spacer is attached to the magnet carrier or may be part of the same.

When spacers that reduce the mechanical friction on the inner side of the pipe, such as for example skids or wheels, are used, the eddy current braking unit can be designed specifically and independently of mechanical frictional forces. The same also applies correspondingly to the carrier units.

A pig according to the invention with an eddy current braking unit is improved in being adaptable to respective pipeline situations in particular whenever the spacer is variable in such a way that, when projected onto a plane perpendicularly to the longitudinal axis of the pig, the spacer can be positioned in relation to the magnets. As a result, the distance of the magnets from the pipe wall can be set. Depending on the maximum speed that occurs in the pipe, the braking force exerted by the eddy current braking unit is adaptable.

The following applies for the eddy current braking force $$F_{Brake} = \int_V (\sigma v \times B) \times B \, dV,$$

where $\sigma$ is the electrical conductivity of the pipe, v is the speed of the pig and B is the magnetic flux density in the magnetized pipe. The eddy current density $j = \sigma v \times B$.

The eddy current braking unit is preferably connected as an independent subassembly of the pig to the functional unit in particular by way of a joint. It may however also be partially fitted with sensors for recording data of the pipe, and consequently represent a combined eddy current braking and functional unit.

If $F_{Brake}$ (v1) for a pipe diameter $D_1$ with an undisturbed advancement without any cross-sectional constriction and with a pig speed v1 is known, it has been found from an extensive number of simulations that the braking force for setups with identical carrier units can preferably be determined as follows for different pipe diameters $D_{Pipe}$.

$$F_{Brake}(D_{Pipe}, v1) = F_{Brake}(v1) * D_{Pipe}/D1$$

Preferably, with a speed v1 of the pig of 2 m/s, a lower estimate is obtained for the braking force $F_{Brake}$ according to the following approximation:

$$F_{Brake} = m * D_{Pipe},$$

where $D_{Pipe}$=diameter of the pipe in meters, m=7000 N/m

This gives an advantageous formation in particular for pipes up to a diameter of 0.80 m; the lower estimate tends to be higher for larger diameters, since the braking forces may also be greater and longer carrier units may be used on account of greater bends.

The spacers may preferably be designed as rollers arranged on the carrier unit, by way of which the carrier unit can be supported on a pipe wall in a friction-reducing manner. However, they may also be skids, cups or other spacers.

The carrier units are preferably mounted movably in the direction transverse to the longitudinal axis of the pig, in order to better overcome or pass through unevennesses and bends.

BRIEF DESCRIPTION OF THE DRAWINGS

Further advantages and details of the invention can be taken from the description of figures with exemplary embodiments that follows. In the schematic figures.

DETAILED DESCRIPTION

Figure 1:
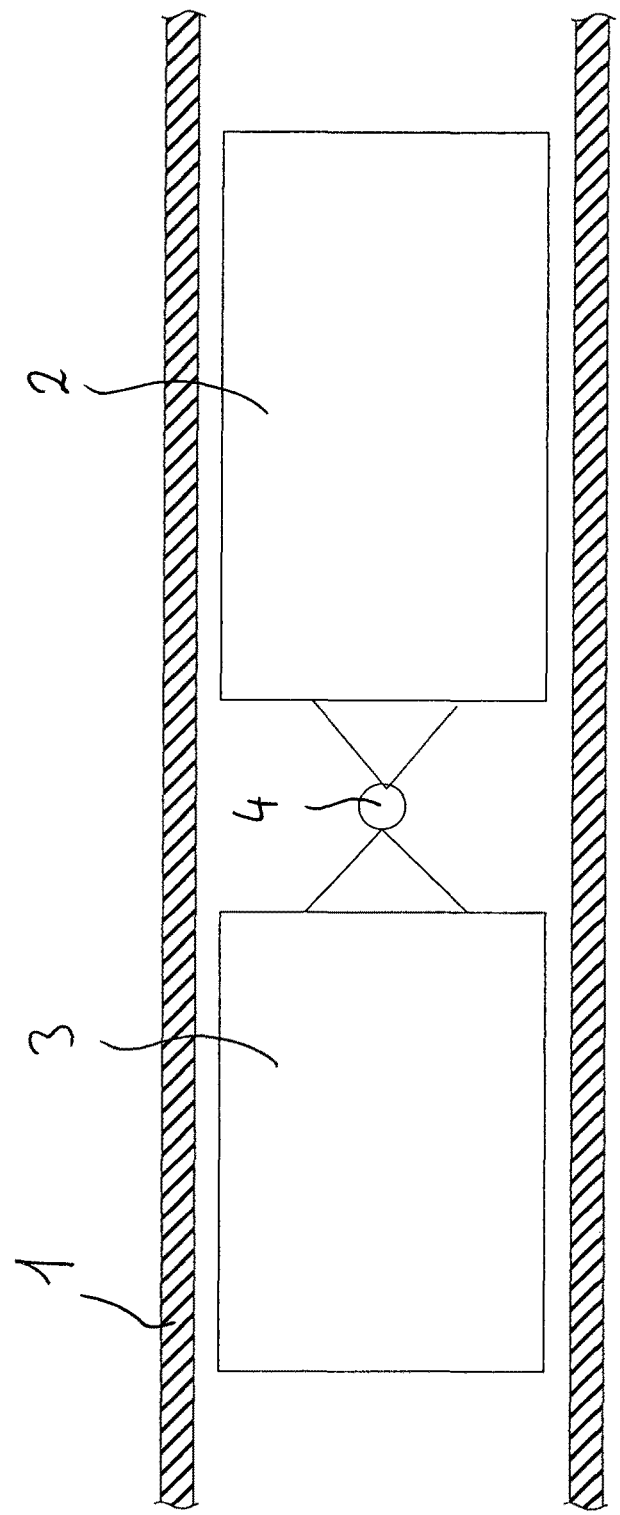
FIG. 1 shows a basic representation of a device according to the invention.

Individual technical features of the exemplary embodiments described below may also be combined in combination with exemplary embodiments described above and also the features of the independent claims and any other claims to form devices according to the invention. Wherever meaningful, elements that act functionally in the same way are provided with identical reference numerals.

A pig according to the invention, which is designed for traveling through an elongate, preferably cross-sectionally substantially circular, pipe 1 with a hatched wall has in the present case a functional unit 2 for recording pipe information and also an eddy current braking unit 3. The two units are connected to one another in an articulated manner by way of a joint 4.

Figure 2:
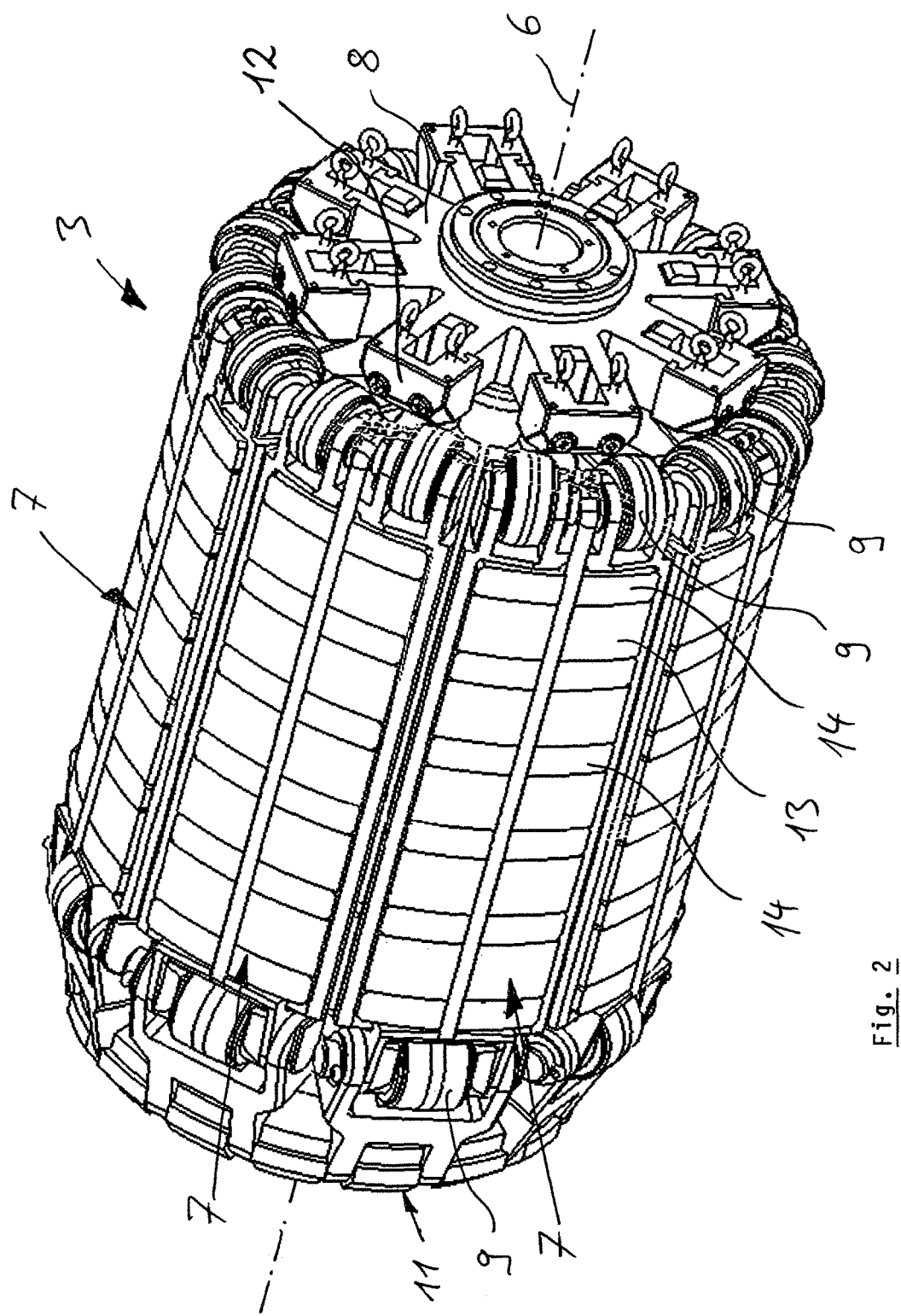
FIG. 2 shows a device according to the invention in a partial view.

The eddy current braking unit 3 is provided with a plurality of carrier units 7 arranged in the circumferential direction of the pig about a longitudinal axis 6, which corresponds to the longitudinal center axis. In the longitudinal direction of the pig consequently means in a direction parallel to the longitudinal center axis or longitudinal axis 6. The eddy current braking unit as shown in FIG. 2 has a total of eight carrier units, which are designed for the formation of eddy currents lying one behind the other in the longitudinal direction of the pipe and flowing in opposite directions. The carrier units 7 are arranged movably in the radial direction on a carrier body 8, in order to be able to compensate for unevennesses on the inner side of the pipe. At one end, each carrier unit has two spacers 9 in the form of rollers, while at the opposite end a single roller is respectively arranged. On the side with only one spacer 9, the carrier unit is arranged on the main body of the eddy current braking unit in an articulated manner by way of a joint 11. By detaching a covering 12, a carrier unit 7 can be swung out, in order to make adjusting means located on the side lying toward the longitudinal center axis accessible. By way of such adjusting means, individual magnets 13 or associated connecting elements 14 can be positioned further outward or inward, in order to be able to vary the distance from the pipe wall. As a result, the braking force obtained during the operation of the unit can be set in an easy way for respective ambient situations. In a modular form, the carrier units can also be used in the case of eddy current braking units for other internal pipe diameters and be correspondingly adapted.

Figure 3:
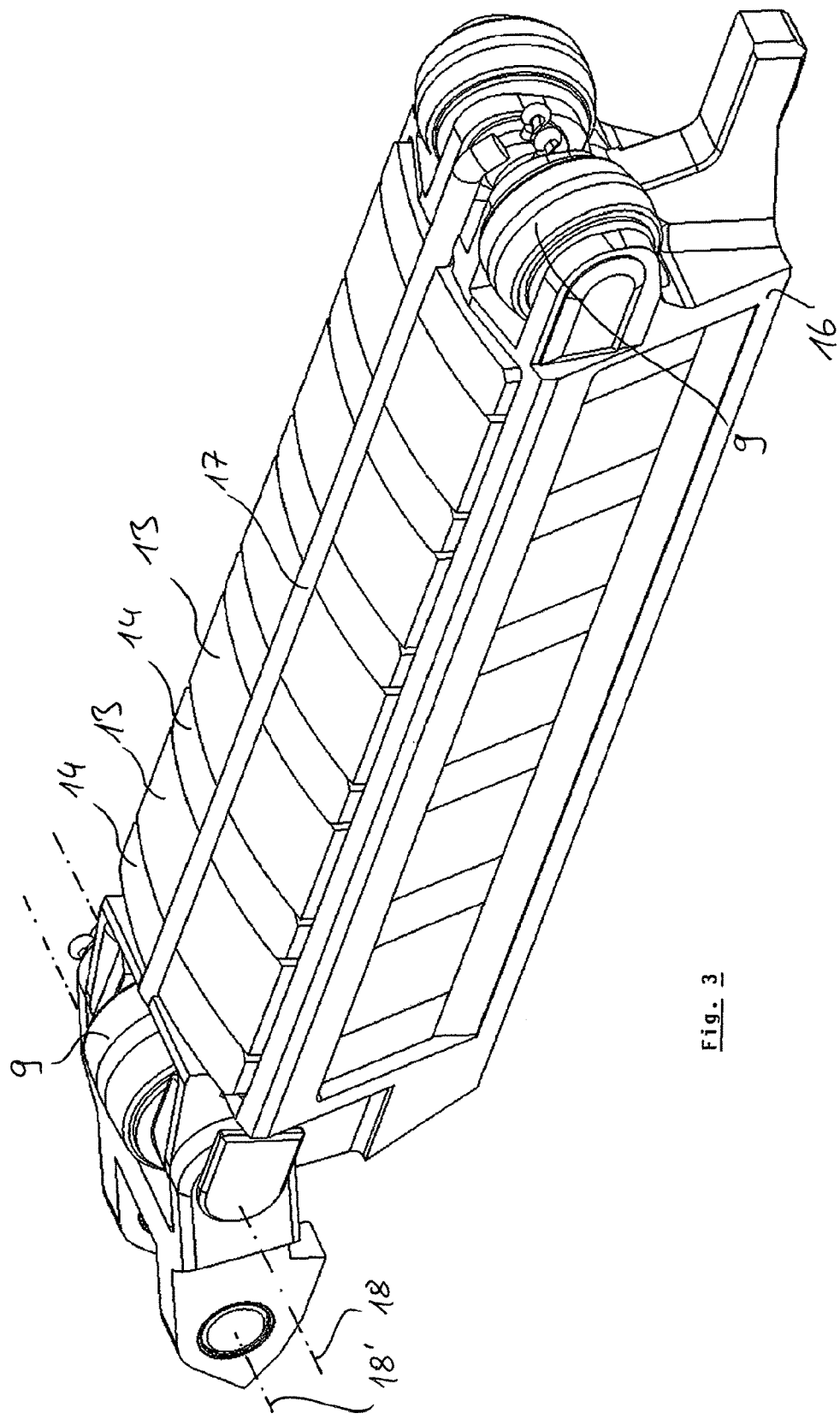
FIG. 3 shows a part of the device as shown in FIG. 2.

A single carrier unit is shown in FIG. 3. The carrier unit has a carrier main body 16, which has a substantially U-shaped form and between the legs of which connecting elements 14 and magnets 13 are alternately arranged. The outer-lying connecting elements 14 are only connected to one magnet 13. A rod 17 serves for ensuring a minimum distance from the pipe wall and with the respective wheels prevents the connecting elements 14 from lying on the inner wall of the pipe. Depending on the configuration of the carrier unit, the carrier body 16 may—but does not have to—be pivotable about an axis 18 or 18'.

Figure 4:
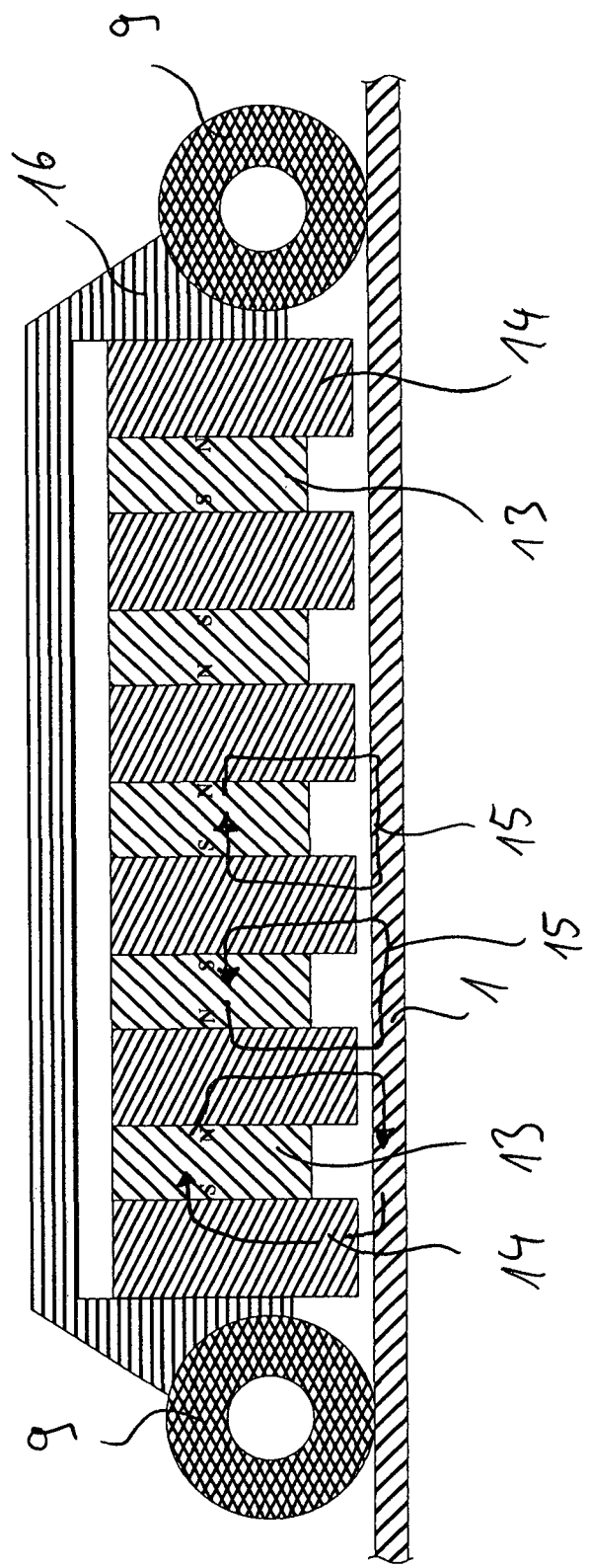
FIG. 4 shows a longitudinal section through a part of a further device according to the invention.

The basic longitudinal section through a carrier unit according to FIG. 4 shows the carrier body 16, the spacers 9, which may be arranged on the carrier body 16, and the fastening elements 14, located between the legs of the carrier body, including the magnets 13 depicted with polarities "S" and "N". Arrows 15 show by way of example the alignment of the magnetic field lines.

Figure 5:
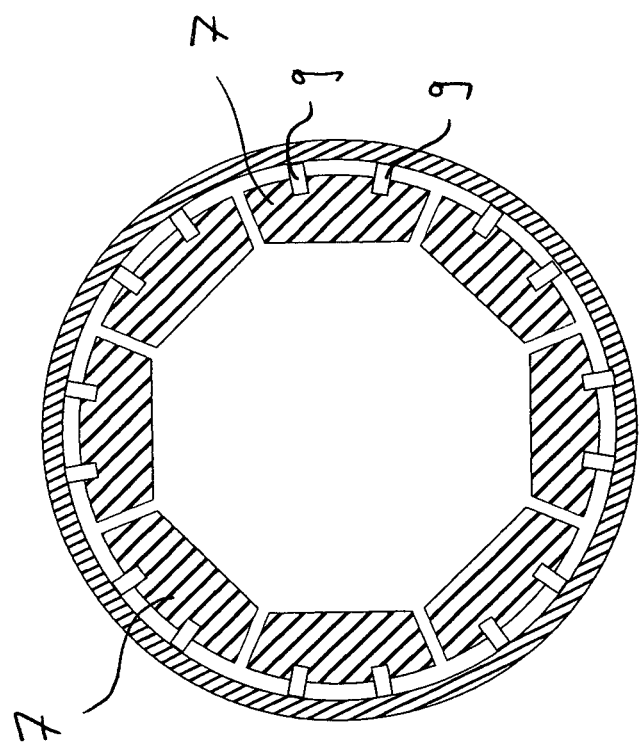
FIG. 5 shows a cross section through a further device according to the invention.
Figure 6:
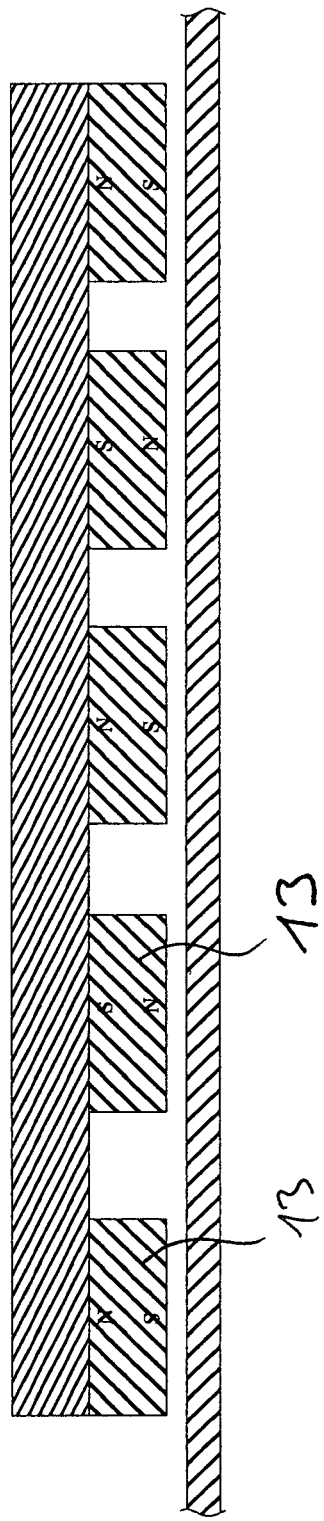
FIG. 6 shows a longitudinal section through a part of a further device according to the invention.

A basic view in cross section is shown in FIG. 5. The inwardly conically tapering carrier units are arranged completely along the circumference around the longitudinal axis of the pig. This allows eddy currents to be generated in the pipeline wall in the circumferential direction of the pig, running around it. The construction of the magnets as in FIGS. 6 and 4 is preferably used. While the construction of FIG. 4 is preferred, since there the flux lines are concentrated and deflected by the connecting elements and introduced perpendicularly into the pipe wall, no concentration toward the pipe wall is obtained on the basis of the magnets 13 aligned perpendicularly to the pipe wall in FIG. 6. The magnets 13 are connected by way of a connecting element 14, which however is not on the side of the nearest pipe wall.

Rather, fewer magnets are used over the same length of the eddy current braking unit. This leads to a lower flux density, and consequently to an inferior efficiency of the eddy current braking unit of a pig according to the invention.

Figure 7:
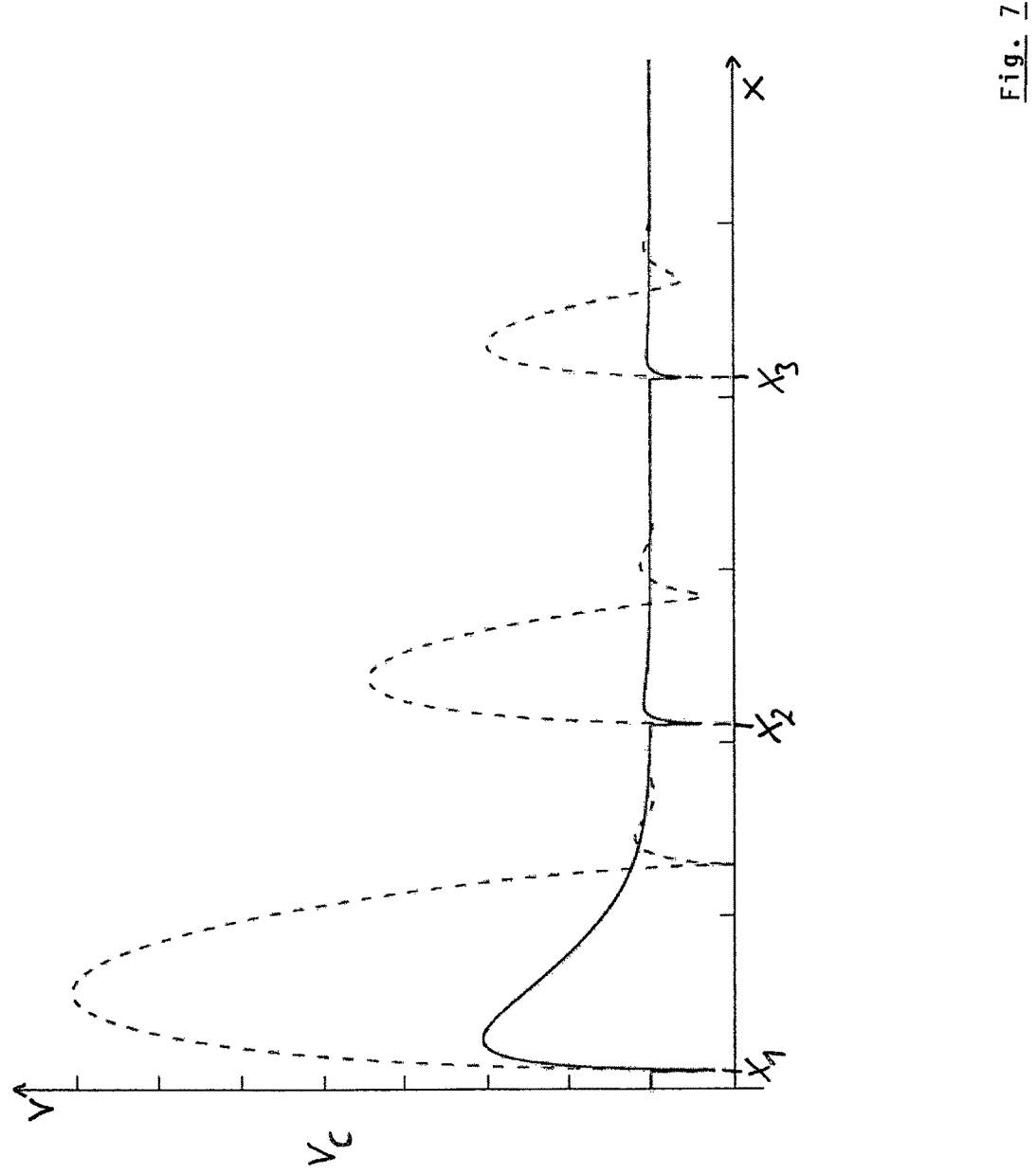
FIG. 7 shows a diagram for the operation of a device according to the invention.

FIG. 7 shows results of simulating a development of the speed of a pig with a braking unit according to the invention (solid line) and without such a braking unit (dashed line) in a gas-carrying pipe. Obstacles with a braking resistance decreasing in the direction x are arranged at the points $x_1$, $x_2$ and $x_3$. These are, for example, three peripheral weld seams, which bring about an increased friction for pigs traveling through. $v_C$ is a critical speed, from which measuring inaccuracies become too great.

According to the invention, the pig may be designed such that the eddy current braking forces exerted by the eddy current braking unit of the pig running with the flow of the medium are greater than the increases in frictional force produced by possible obstacles. The slowing down of the pig at the first obstacle at the point $x_1$ has the effect that the gas builds up behind the pig, which leads to an increased gas pressure. At the moment at which the frictional force can be overcome, the pig not provided with an eddy current braking unit accelerates strongly and exceeds the critical speed $v_C$. When the pig provided with an eddy current braking unit according to the invention accelerates, an increase in the braking force takes place as a result of the eddy current braking unit, which accompanies the increase in the speed. This slows down the pig, and so, in comparison with a conventional pig, it can quickly reach its operational speed. By contrast, further measuring inaccuracies are brought about by the overshooting of the pig not provided with an eddy current braking unit. Also at the points $x_2$ and $x_3$, which represent locations of increased friction for the pig, the speed of the conventional pig changes greatly, and almost into the critical range, which in turn leads to data inaccuracies. On the other hand, the pig provided with an eddy current braking unit according to the invention can continue running substantially uninfluenced.

The uniform travel of the pig is achieved in particular by the speed-dependent braking force of the pig running with the medium being greater than the possible increase of frictional forces being caused for example by weld seams or dents in the pipe. The decrease in the eddy current-based braking forces on account of the reduction in the speed has the effect of compensating for the increases in frictional force brought about by the narrowings or cross-sectional constrictions of the pipe or produced when passing through bends. The pig continues to run without sticking. Uniform travel of the pig according to the invention has the effect of a significant improvement in a cleaning action and/or the quality of the data in comparison with the prior art.

Figure 8:
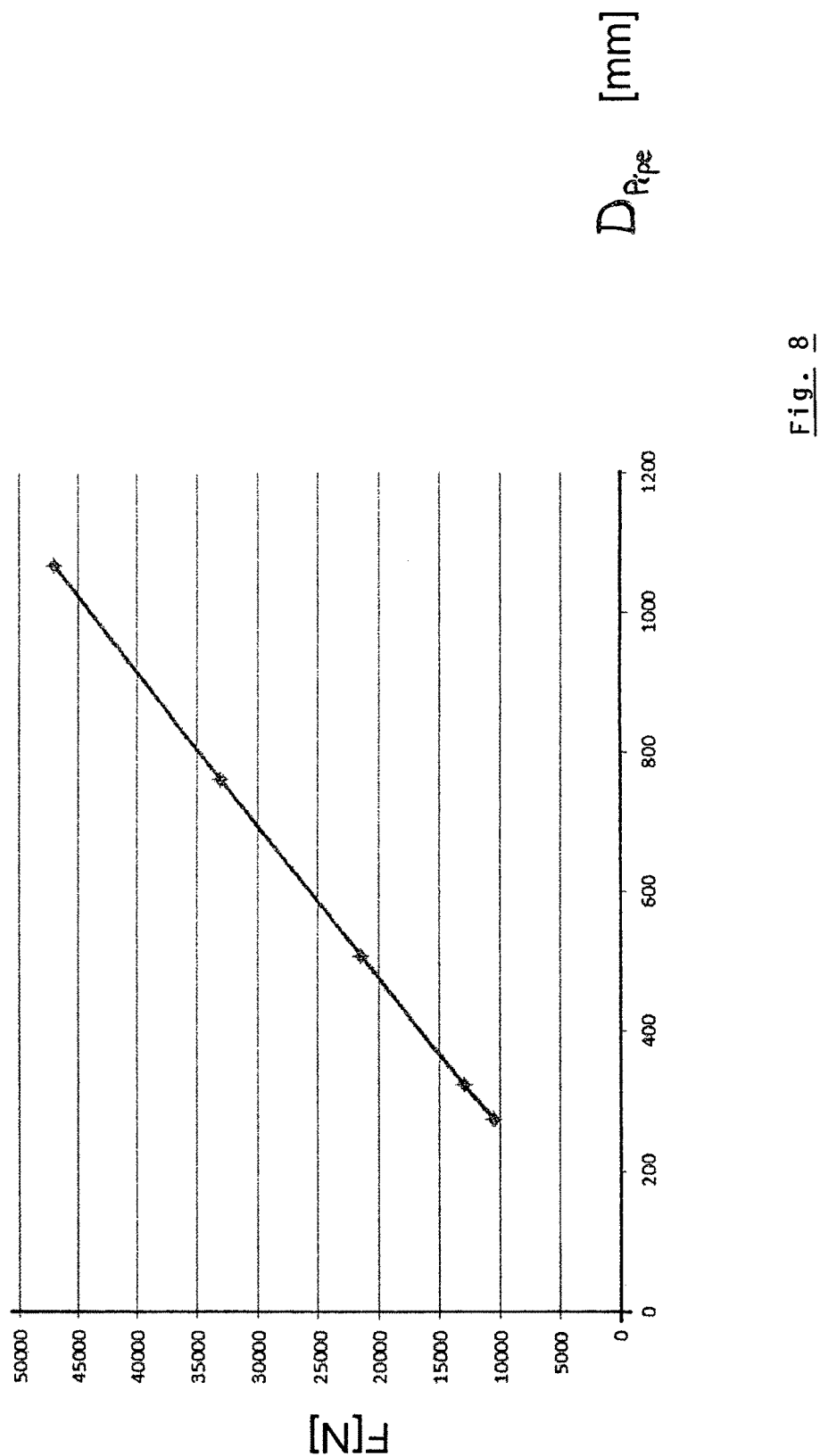
FIG. 8 shows a diagram of the dependence of the braking force of the eddy current braking unit of a pig according to the invention on the pipe diameter.

FIG. 8 shows by way of example for a pipe wall thickness of 7 mm the design of the eddy current braking units in dependence on the pipe diameter. The five different points for the respective diameters show an approximated linear relationship between the eddy current braking units and the pipeline diameter ("$D_{Pipe}$ [mm]") for an often used steel ST 37 at a speed of the pig of 2 m/s ($F_{Brake}$=43314 N/m*$D_{Pipe}$)

Figure 9:
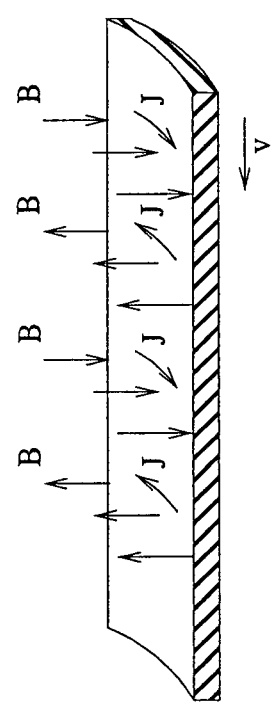
FIGS. 9 and 10 show the alignment of field lines and eddy current lines.
Figure 10:
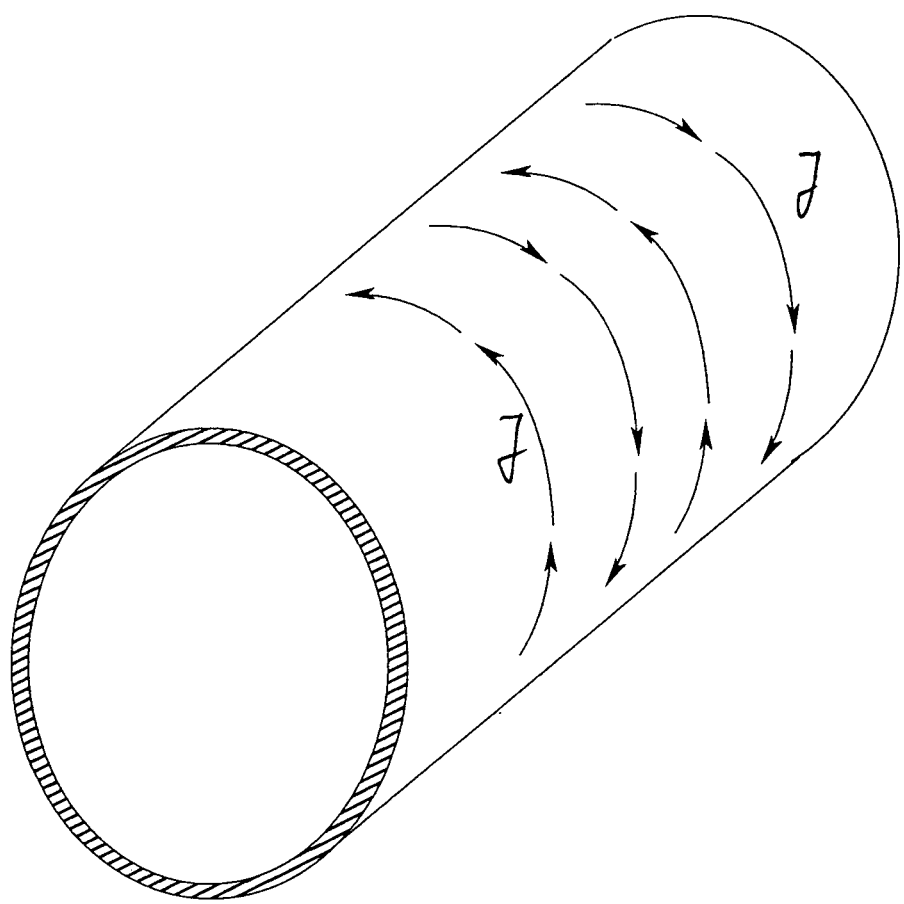

The eddy currents J generated in the circumferential direction, which when considered in the longitudinal direction of the pipe or else in the direction of the speed v run oppositely, are shown in FIGS. 9 and 10. The formation according to the invention of a pig has the effect that the eddy currents J generated run in the circumferential direction and preferably completely around the pipe (cf. FIG. 10). As described above, the magnetic fields generated are provided here likewise alternatingly in the direction perpendicular to the surface of the pipe, i.e. with field lines of opposite directions, and formed substantially radially in relation to the longitudinal axis.

Figure 11:
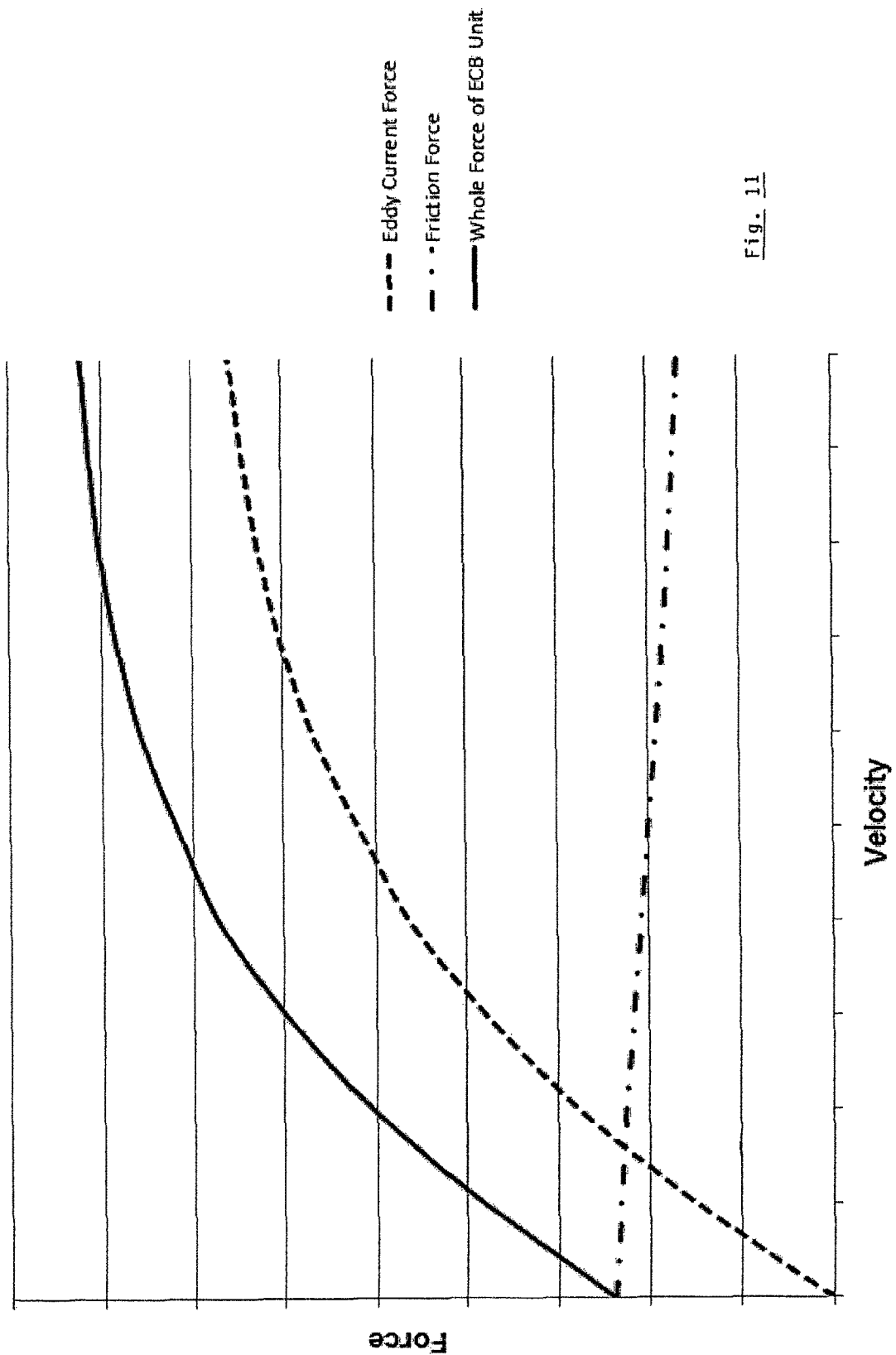
FIG. 11 shows a diagram of the force in dependence on the speed.

The braking force ("Force") of a pig according to the invention is shown (without units) in FIG. 11 as a function of the speed ("Velocity") of the pig. The braking force of the eddy current braking unit ("Eddy Current Force"), which is at zero at a speed of v=0 m/s, is represented by dashed lines. The braking force exerted solely by mechanical friction ("Friction Force") decreases rather with increasing speed and is represented by dashed lines. The change in the mechanical friction as a function of speed is generally much less than the increase in the eddy current force, and can in first approximation be ignored. Shown by a solid line is the sum of the resultant braking force ("Whole Force of ECB Unit"). In order that a pig according to the invention with the eddy current braking unit can pass an obstacle without stopping, the increase in friction of the pig (comprising the braking unit and on account of the obstacle) must be less than the braking force at the speed of the pig less the braking force at a speed of zero.

The invention claimed is:

1. A pig for inspection or cleaning of an elongate pipe having a pipe wall, said pig comprising:
    an eddy current braking unit extending in a longitudinal direction, said eddy current braking unit having a plurality of magnets arranged one behind the other with alternating polarities in said longitudinal direction,
    wherein, said eddy current braking unit produces a speed-dependent braking force by interaction of the plurality of magnets with magnetic fields induced in the wall of the pipe on account of eddy current.

2. The pig as claimed in claim 1, wherein at least three magnets are arranged one behind the other.

3. The pig as claimed in claim 1, wherein the magnets have a first dimension from pole to pole less than a second dimension of the magnets transversely thereto.

4. The pig as claimed in claim 1, wherein multiple magnets are arranged on a carrier unit.

5. The pig as claimed in claim 4, wherein the pig has a circumference and multiple carrier units are arranged next to one another around the circumference of the pig.

6. The pig as claimed in claim 1, comprising at least one spacer, by way of which the magnets can be positioned at a distance from the wall of the pipe.

7. The pig as claimed in claim 6, wherein when projected onto a plane perpendicularly to the longitudinal axis of the pig, the spacer can be positioned in relation to the magnets.

8. The pig as claimed in claim 1, wherein the eddy current braking unit is designed such that it is connected as an independent subassembly of the pig by way of a joint.

9. The pig as claimed in claim 1, wherein the eddy current braking unit has sensors for recording data of the pipe.

10. The pig as claimed in claim 1, wherein, with a speed of 2 m/s in the pipe, the eddy current braking unit a braking force $F_{Brake}$ in dependence on the pipe diameter of at least $$F_{Brake}=m*D_{Pipe},$$

where $D_{Pipe}$=diameter of the pipe [m], m=7000 N/m.

11. A pig for inspection or cleaning of an elongate pipe having a pipe wall, said pig comprising:
    an eddy current braking unit having a plurality of magnets arranged to generate eddy currents in the wall of the pipe in a circumferential direction running around the pig, wherein, said eddy current braking unit produces a speed-dependent braking force by interaction of the plurality of magnets with magnetic fields induced in the wall of the pipe on account of eddy current.

12. The pig as claimed in claim 11, wherein a plurality of eddy currents flowing alternately in opposite directions are generated during the operation of the pig.

13. The pig as claimed in claim 11, wherein the plurality of magnets have a first dimension from pole to pole less than a second dimension of the magnets transversely thereto.

14. The pig as claimed in claim 11, wherein multiple magnets of said plurality of magnets are arranged on a carrier unit.

15. The pig as claimed in claim 14, wherein multiple carrier units are arranged next to one another in the circumferential direction.

16. A pig for inspection or cleaning of an elongate pipe having a pipe wall, said pig comprising:
an eddy current braking unit having a plurality of magnets assigned at least one magnetically permeable connecting element, which connects at least two magnets to one another,
wherein, said eddy current braking unit produces a speed-dependent braking force by interaction of the magnets with magnetic fields induced in the wall of the pipe on account of eddy current.

17. The pig as claimed in claim 16, wherein the connecting element is aligned with the wall of the pipe in such a way that the magnetic flux enters the wall of the pipe substantially perpendicularly.

18. The pig as claimed in claim 16, wherein the plurality of magnets have a first dimension from pole to pole less than a second dimension of the magnets transversely thereto.

19. The pig as claimed in claim 16, wherein multiple magnets of said plurality of magnets are arranged on a carrier unit.

20. The pig as claimed in claim 19, wherein the pig has a circumference and multiple carrier units are arranged next to one another around the circumference of the pig.

* * * * *